Patented Mar. 18, 1930

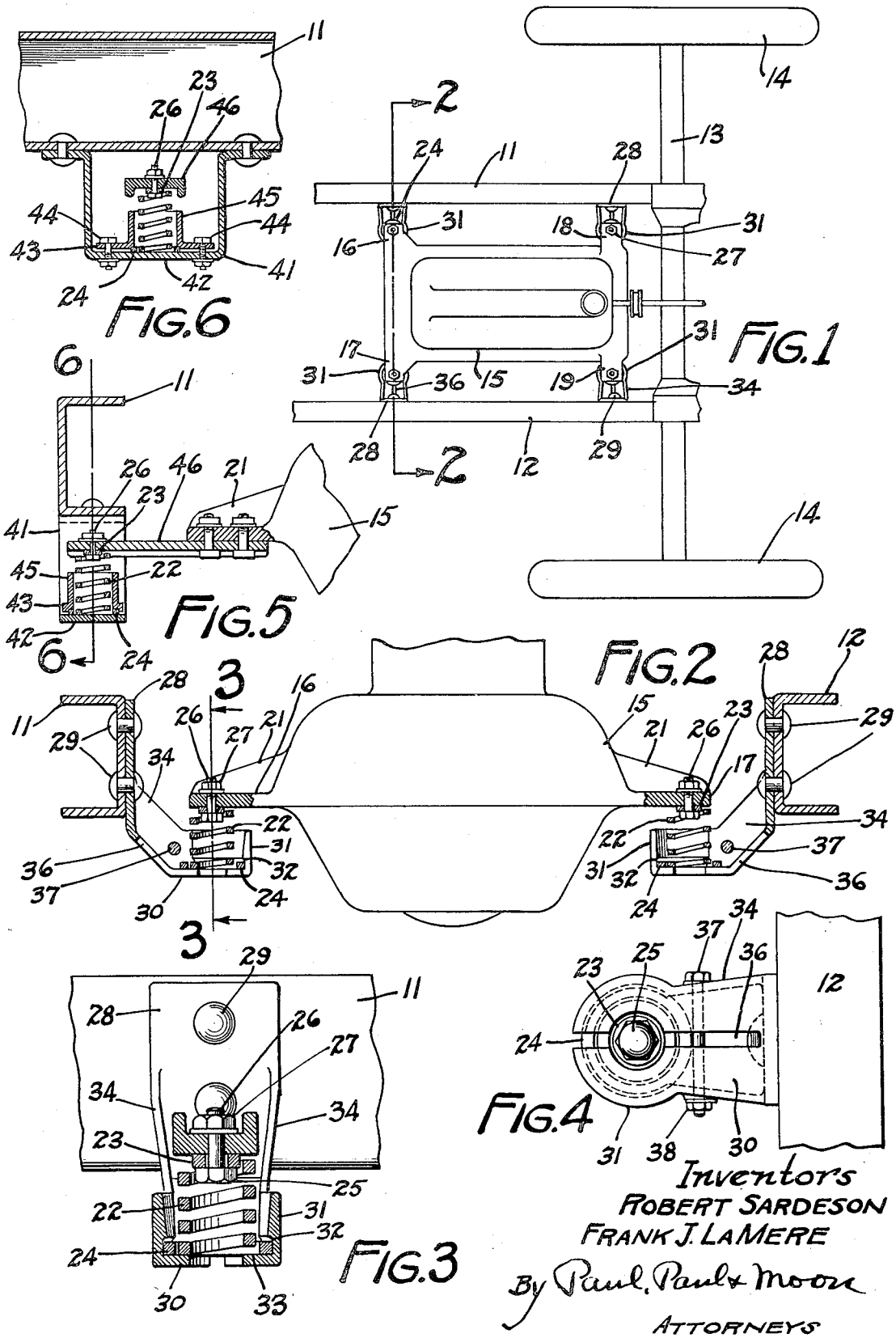

1,751,100

UNITED STATES PATENT OFFICE

ROBERT SARDESON AND FRANK J. LA MERE, OF MINNEAPOLIS, MINNESOTA, ASSIGNORS TO SARDESON & LA MERE PATENTS HOLDING COMPANY, LTD., OF MINNEAPOLIS, MINNESOTA, A PARTNERSHIP COMPOSED OF J. D. STRUTZEL, FRANK J. LA MERE, ROBERT SARDESON, JOHN CORSER, AND MARTINSON BROTHERS & OSBORN, INC.

ENGINE MOUNTING FOR AUTOMOTIVE VEHICLES

Application filed January 12, 1925. Serial No. 1,905.

This invention relates to a novel engine mounting for automotive vehicles and it is more particularly adapted to absorb vibrations occurring between an internal combustion engine and its support. Such vibrations may be caused by unbalanced forces resulting from the running of the engine, such as the imperfect balancing of the moving parts of the engine and any uneven internal combustions and from what is technically known as the secondary balanced forces inherent in reciprocating engines, and more particularly in such engines of the four-cylinder type, although such forces inhere in eight-cylinder types and to a certain extent in other types. The disadvantages are particularly manifest when the vehicle reaches what is known as its "critical speed" at which speed the vibrations are amplified and generally most severe.

These disadvantageous vibrations are overcome or minimized by means of a novel engine mounting which generally consists in resiliently connecting the engine to its support upon the vehicle so that the vibrations are damped or absorbed.

The object of this invention is to provide an improved engine mounting for automotive vehicles.

Other objects of the invention will appear from the following description and the accompanying drawings and will be pointed out in the annexed claims.

In the drawings there has been disclosed a structure designed to carry out the objects of the invention but it is to be understood that the invention is not confined to the exact features shown as various changes may be made within the scope of the claims which follow.

In the drawings:

Figure 1 is a plan view of the forward portion of the chassis of an automotive vehicle showing a conventional representation of an engine with the invention applied thereto;

Figure 2 is a vertical sectional view on the line 2—2 of Figure 1;

Figure 3 is a vertical sectional view through one of the resilient elements and connections;

Figure 4 is a bottom view of one of the brackets supporting the resilient connection;

Figure 5 is a vertical sectional view through a modified form of resilient element mounting; and Figure 6 is a vertical sectional view on the line 6—6 through the mounting shown in Figure 5.

In the selected embodiment of the invention, there is illustrated the usual side frames 11 and 12 of an automotive vehicle. These side frames are borne in the usual manner by the front axle 13 having the usual wheels 14. The internal combustion engine here represented is not rigidly bolted to the side frames 11 and 12 as is usual; but, is supported by these frames through a resilient connection.

The engine casing 15 is shown as of the usual elongated type and is provided with integral members such as the arms 16, 17, 18 and 19 of which one extends outwardly from each corner of the engine. These arms are preferably reinforced by means of integral ribs 21. It is preferred to employ these arms which are more or less of standard construction in combination with resilient elements which connect the engine to its support upon the chassis frame. The form of spring 22 shown in the drawings is of the coil-type and each has its upper turn 23 and lower turn 24 shaped substantially in the form of a circle. The upper turn 23 is preferably of less diameter than that of the remaining convolutions and is also less than the head 25 of the bolt 26 which is upwardly passed through an engine arm and the spring and bolt are held in assembled position by means of the nut 27 so that the upper end of the spring is rigidly connected to the engine. The lower turn 24 of each spring is of greater diameter than the other convolutions and is adapted to be received within a two-part clamping device forming, with the vehicle frame, the support for the engine. The lower portion of each spring is rigidly connected to adjacent frame by means of a bracket having a split clamping portion. Each bracket has a substantially straight back 28 which is held to the inner face of the adjacent frame as by means of the rivets 29. Depending from each bracket is a substantially cup-shaped structure having a split bottom and integrally connected to the back 28 by means of the web 30. The substantially annular side 31 of such cup-like structure is provided with an inwardly presented recess extending the major portion around the structure. This arcuate recess 32 is formed by gradually thickening the metal of the side in a downward direction to a line above the bottom 33 a distance slightly greater than the thickness of the spring. The bottom turn 24 of the spring is thus receivable within the arcuate recess 32. The side of the cup-like structure is not annular but terminates at each end in the two ribs 34 which are spaced apart in upstanding relation to the bracket web 30. The bottom 33 is transversely split and this split 36 extends along the major portion of the web 30. The opposed ribs 34 are formed with apertures in alinement to receive the headed clamping bolt 37 having a nut 38 by means of which the split portions may be drawn together and so held in order to maintain the bottom turn of the spring in rigid relation to the support. Thus, the upper and lower turns of each spring are rigidly held respectively to the engine and support.

Preferably each spring does not possess the same characteristics as to resiliency. Tests have shown that, while springs of like characteristics will damp or absorb vibrations, greater absorptive advantages are obtained when one of the springs is weaker or stronger in its resilient characteristics than the others. The explanation seems to reside in the physical phenomena that harmonic vibrations are reduced. Preferably, such a stronger or stiffer spring is placed at the left rear position or conversely a spring weaker than the others may be placed at the right forward position. The preferred assembly is one in which the spring at the left forward position is stronger than the one at the right forward position while the spring at the right rear is stronger, than that at the left forward position while the left rear is the stiffest or strongest—thus including in consideration the torsional thrust of the running engine.

In the modified form of mounting illustrated in Figures 5, and 6, the spring occupies substantially an underslung position with relation to the chassis of the vehicle. A hanger 41 is securely fixed to the underface of the adjacent side frame and upon its transverse bar 42 is secured to the spring-holder. This form of spring-holder is substantially cup-shaped. The flanged portion of the cylinder forms the base 43 of the holder which is adapted to be secured to the bar 42 by means of the bolts and nuts 44 which are passed through alined apertures in the bar 42 and the holder base 43. The cylindrical portion or cup 45 of the holder is preferably integral with its base 43 and has its inner wall adjacent the base undercut so as to present an inner annular recess for the reception of the circular lower turn 24 of the spring 22. Preferably, the depth of the annular recess is less than the thickness of the lower turn 24 so that when the bolts and nuts 44 are tightened the lower turn 24 will be fixedly clamped to the bar 42 by the walls of the annular recess and the lower end of the spring will thus be rigidly connected to the supporting bar.

The upper turn 23 of the spring is rigidly clamped in a manner similar to that set forth above, wherein the small circular upper turn is rigidly held against the engine part by means of the bolt 26. In the modified form, the engine casing has an auxiliary sub-frame member such as the bar 46 which is riveted at one end to the adjacent casing arm and outwardly extends between the depending portions of the hanger 41 for reception of the bolt 26 by means of which the upper turn of the spring is rigidly held thereto.

Having thus described our invention what we claim as new and desire to secure by Letters-Patent, is:

1. A device of the class described comprising a bracket having a cup-shaped socket and a circumferential groove at the inner side of its wall, said bracket being slotted to permit springing of the socket members thus formed, to clamp the terminal of a spring within the groove.

2. A suspension unit comprising in combination with supporting and supported elements, brackets upon the supporting elements, coiled springs one for each bracket having a terminal coil of large diameter clampingly engaged by the bracket, each spring having intermediate coils of substantially less diameter than the terminal coil, and further having a coil at the opposite end of substantially less diameter than the intermediate coils connected with the supported element above the springs.

3. A suspension unit comprising in combination with supporting and supported elements, brackets upon the supporting elements, coiled springs one for each bracket having a terminal coil of large diameter clampingly engaged by the bracket, each spring having intermediate coils of substantially less diameter than the terminal coil, and further having a coil at the opposite end of substantially less diameter than the intermediate coils connected with the supported element above the springs, the degree of compressibility of some of said springs differing from that of the others.

4. A device of the class described comprising supporting and supported elements, springs each having coil portions respectively of larger and of smaller diameter than the intermediate portion of the spring, a fastening device securing each smaller coil to one of the elements and a fastening device securing each large coil to the other element, the latter fastening device being applied peripherally at a point outside the periphery of the intermediate coil portion.

5. A device of the class described comprising supporting and supported elements, springs each having terminal coil portions, a fastening device securing one coil portion of each spring to one of the elements, and a fastening device securing the other coil portion of each spring to the other element, the latter fastening devices being applied peripherally.

6. In combination, an automobile chassis and an engine having compression springs as the sole means connecting them, said springs being arranged in a manner to permit free lateral motion of the engine in all directions relative to the chassis and also to permit free up and down motion, some of the springs being more elastic than others.

7. In combination, an automobile chassis and an engine, having compression springs connecting them, said springs being symmetrically arranged with respect to and laterally of the engine in a manner to permit free lateral motion of the engine in all directions relative to the chassis, and also to permit free up and down motion, the axes of the springs being substantially vertically disposed and each spring being connected only by its terminals, respectively to engine and chassis.

8. In combination an automobile chassis and an engine, having compression springs as the sole means connecting them, said springs being arranged substantially as the corners of a rectangle symmetrically with respect to the engine, and laterally thereof, in a manner to permit free lateral motion of the engine in all directions relative to the chassis, and also to permit free up and down motion, the axes of the springs being substantially vertically disposed, and each spring being connected only by its terminals respectively to engine and chassis.

In witness whereof, we have hereunto set our hands this 6th day of January, 1925.

ROBERT SARDESON.
FRANK J. LA MERE.